(12) United States Patent
Johannsen

(10) Patent No.: US 6,860,378 B1
(45) Date of Patent: Mar. 1, 2005

(54) BELT SCRAPER TENSIONING DEVICE

(75) Inventor: Thor J. Johannsen, Norval (CA)

(73) Assignee: Thor Global Enterprises Ltd., Mississauga (CA)

( * ) Notice: Subject to any disclaimer, the term of this patent is extended or adjusted under 35 U.S.C. 154(b) by 0 days.

(21) Appl. No.: 10/705,550

(22) Filed: Nov. 11, 2003

(51) Int. Cl.[7] ................................................. B65G 45/00
(52) U.S. Cl. ..................................................... 198/497
(58) Field of Search ................................ 198/497, 498, 198/499

(56) References Cited

U.S. PATENT DOCUMENTS

| | | | |
|---|---|---|---|
| 4,586,600 A | * | 5/1986 | Lindbeck ..................... 198/499 |
| 5,301,797 A | * | 4/1994 | Hollyfield et al. .......... 198/499 |
| 5,339,947 A | | 8/1994 | Campanile |
| 5,355,992 A | | 10/1994 | Baig et al. |
| 5,378,202 A | | 1/1995 | Swinderman |
| 5,497,872 A | | 3/1996 | Pennino |
| 5,542,525 A | | 8/1996 | Kornely |
| 5,573,102 A | | 11/1996 | Puchalla |
| 5,628,392 A | | 5/1997 | Stoll et al. |
| 5,647,476 A | | 7/1997 | Veenhof |
| 5,657,852 A | | 8/1997 | Bavington |
| 5,657,853 A | | 8/1997 | Pennino |
| 5,692,595 A | | 12/1997 | Gilbert |
| 5,725,083 A | | 3/1998 | Archer |
| 5,727,670 A | | 3/1998 | Johnson |
| 5,735,385 A | | 4/1998 | Bowler et al. |
| 5,746,302 A | | 5/1998 | Bowman |
| 5,797,477 A | | 8/1998 | Veenhof |
| 5,826,700 A | | 10/1998 | Brink |
| 5,845,761 A | | 12/1998 | Davidts et al. |
| 5,865,997 A | | 2/1999 | Isaacs |
| 5,875,881 A | | 3/1999 | Brink |
| 5,893,450 A | | 4/1999 | Metivier |
| 5,950,803 A | | 9/1999 | Schwarze |
| 6,056,112 A | | 5/2000 | Wiggins |
| 6,179,114 B1 | | 1/2001 | Brink |
| 6,283,274 B1 | * | 9/2001 | Dolan et al. ................. 198/499 |
| 6,360,875 B1 | * | 3/2002 | Altemus et al. ............ 198/499 |
| 6,374,991 B1 | * | 4/2002 | Swinderman ............... 198/499 |
| 6,681,919 B1 | * | 1/2004 | Brink .......................... 198/499 |

* cited by examiner

*Primary Examiner*—Richard Ridley
(74) *Attorney, Agent, or Firm*—R. Kent Roberts; Hodgson Russ LLP

(57) ABSTRACT

A conveyor belt scraper tensioning device including a support member mounted to at least partially rotate about a first axis, the support member being radially spaced apart from the first axis and having a scraper blade bracket for securing a scraper blade thereto. The device also includes a torsion bar located substantially along the first axis for imparting a torsional bias to the support member, the torsion bar having a first portion connected to the support member and a further portion spaced apart from and at least partially rotatable relative to the support member. A lever member is connected to the further portion of the torsion bar at at location spaced apart from the first portion for imparting torsional bias on the torsion bar.

14 Claims, 3 Drawing Sheets

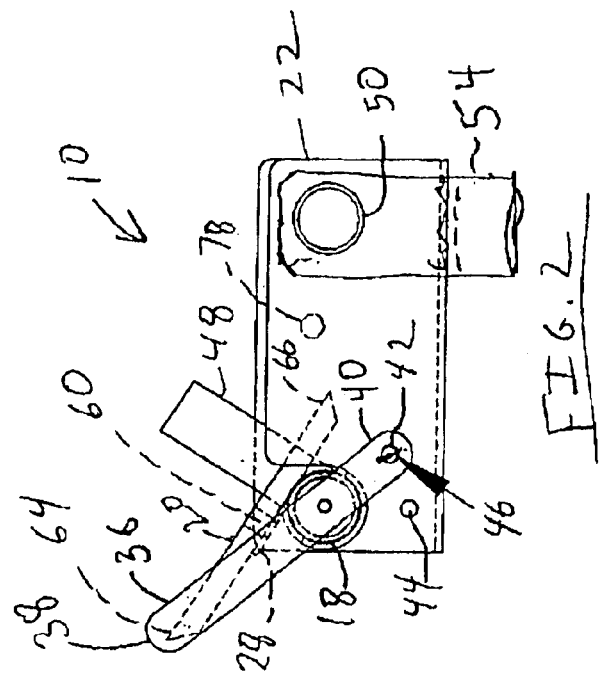
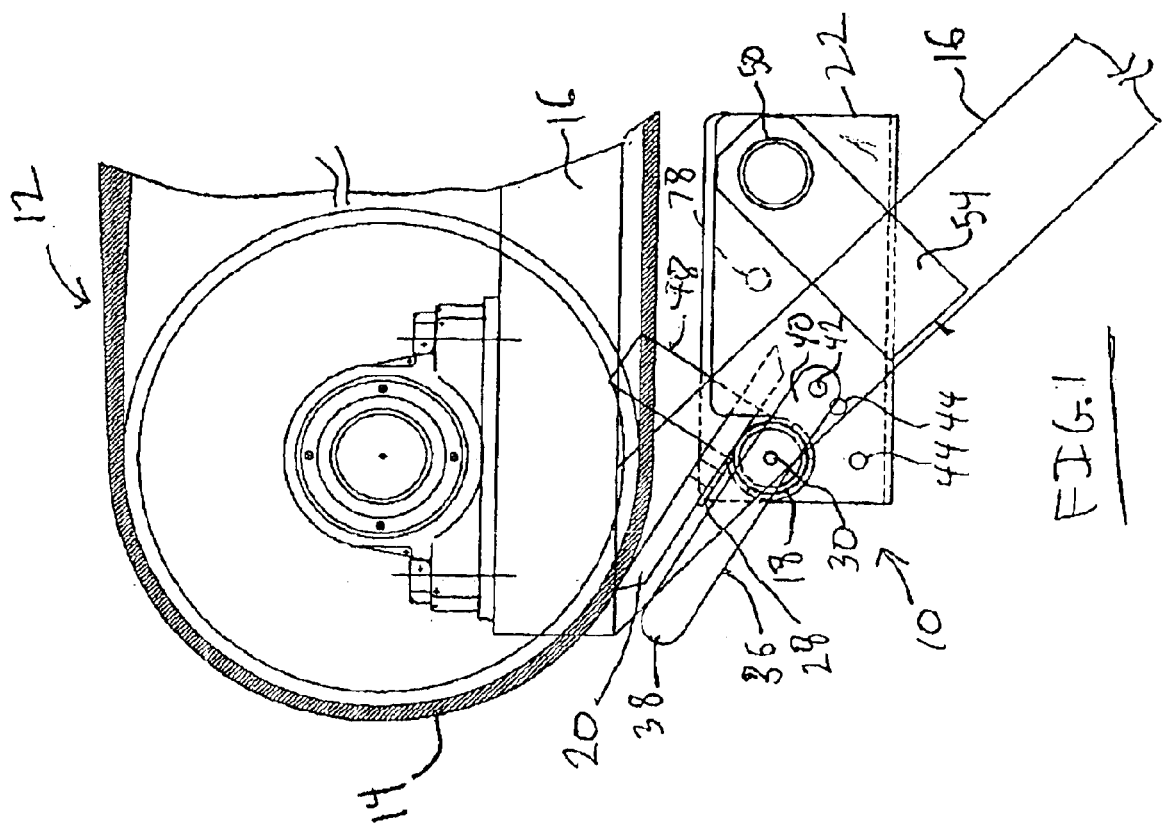

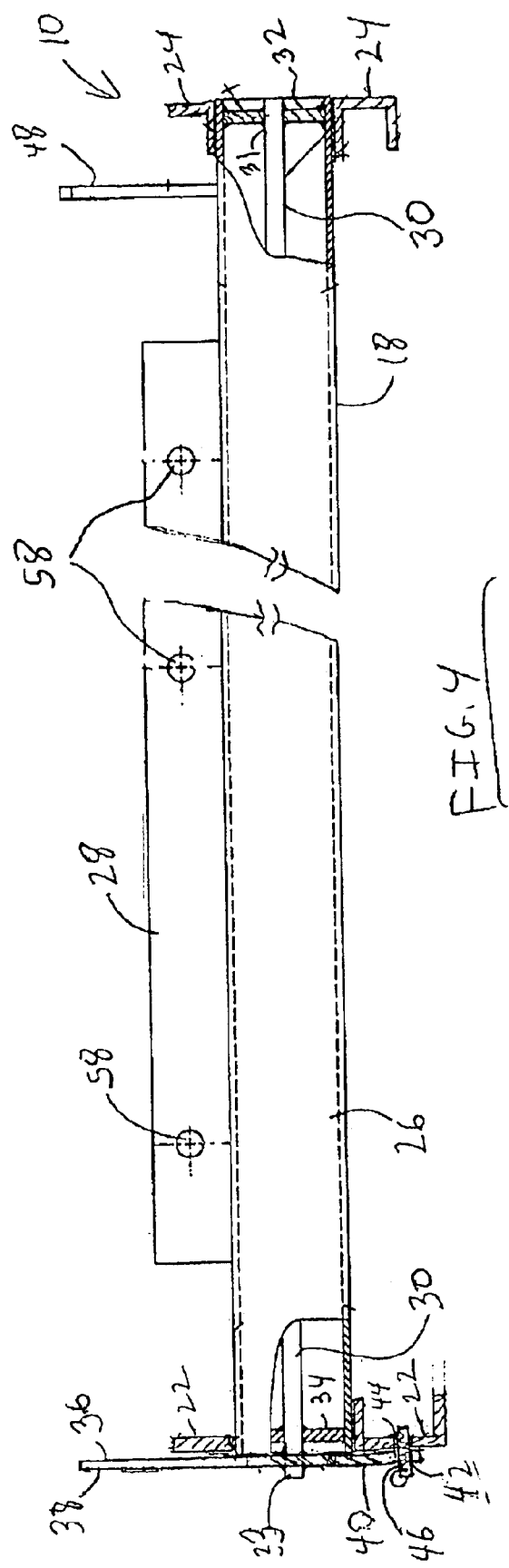

BELT SCRAPER TENSIONING DEVICE

BACKGROUND OF THE INVENTION

The present invention relates to belt scrapers for conveyor belts.

Scraper blades are often used to clean conveyor belts on the return side of the belt. Such devices typically include a shaft that is positioned transverse to the direction of conveyor belt travel and one or more scraper blades are mounted on the shaft. When the shaft is rotated, the scraper blade is forced into engagement with the conveyor belt such that the blade will scrape adherent material from the belt. The scraper blade wears down during use, with the result that the shaft has to be further rotated to maintain the blade in contact with the belt. Various tensioning and biasing devises have been proposed for maintaining contact between the blade and the belt, as shown for example in U.S. Pat. Nos. 5,378,202; 5,727,670; 5,845,761; and 5,826,700.

Nonetheless, there remains a need for a belt scraper and tensioning device that is reliable and which is user friendly and cost efficient to manufacture, install, and operate.

SUMMARY OF THE INVENTION

According to at least one example of the invention there is provided a conveyor belt scraper tensioning device including a support member mounted to at least partially rotate about a first axis, the support member being radially spaced apart from the first axis and having a scraper blade bracket for securing a scraper blade thereto. The device also includes a torsion bar located substantially along the first axis for imparting a torsional bias to the support member, the torsion bar having a first portion connected to the support member and a further portion spaced apart from and at least partially rotatable relative to the support member. A lever member is connected to the further portion of the torsion bar at a location spaced apart from the first portion for imparting torsional bias on the torsion bar.

According to a further example of the invention, there is provided in combination with a conveyor belt system having a conveyor belt mounted to a support frame, a scraper blade support device including a tubular member mounted at opposite ends to the support frame and at least partially rotatable about an axis that is substantially transverse to a direction of: travel of the conveyor belt. A scraper blade extends outward from the tubular member arid has an end for engaging the conveyor belt for removing material therefrom. A torsion bar extends along the axis inside the tubular member, the torsion bar having a first portion rigidly attached to the tubular member for imparting a torsional bias thereto and a further portion partially rotatable relative to the tubular member. A lever member is connected to the further portion of the torsion bar remote from the first portion for imparting a torsional bias to the torsion bar.

BRIEF DESCRIPTION OF THE DRAWINGS

Example embodiments of the present invention will now be described, by way of example only, with reference to the attached Figures, wherein:

FIG. 1 is a side view of a belt scraper installed on a conveyor belt;

FIG. 2 is a side view of the belt scraper;

FIG. 4 is an end view, with cut-away sections, of the belt scraper device.

Like reference numerals are used throughout the Figures to denote similar elements and features.

DETAILED DESCRIPTION

Figure 3:
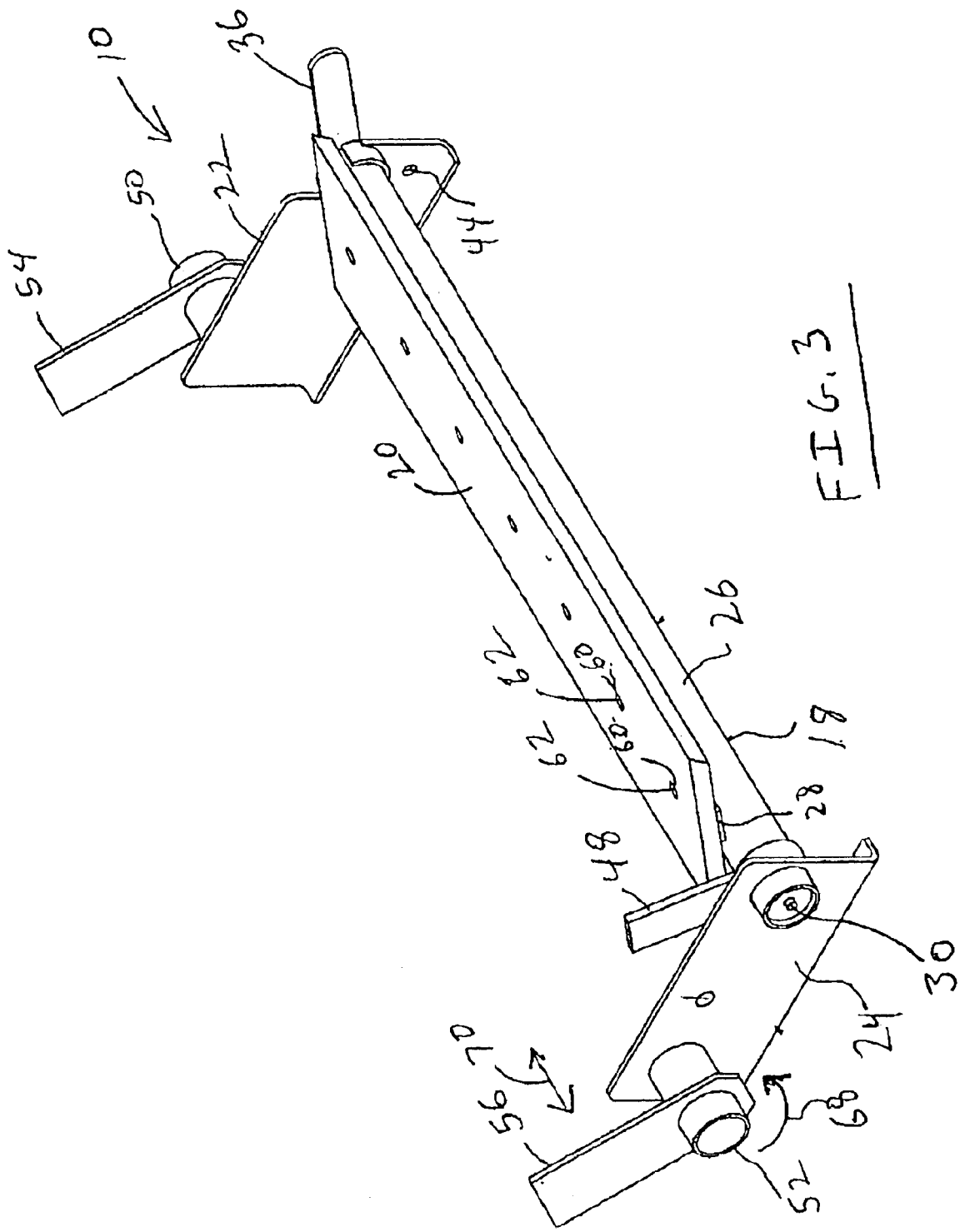
FIG. 3 is a perspective view of the belt scraper.

FIG. 1 shows a belt scraper device, indicated generally by reference 10, according to example embodiments of the invention, installed on a conveyor system, generally indicated by 12, which includes a conveyor belt 14 supported by a conveyor frame 16. The belt scraper 10 is mounted to structural members of the conveyor frame 16 and maintains a scraper blade 20 in contact with the conveyor belt 14 for cleaning adherent material from the return side of the conveyor belt.

With reference to FIGS. 1–3, the belt scraper 10 includes a scraper blade support 18 that extends substantially transverse to the direction of travel of the conveyor belt 14. The scraper blade support 18 includes an elongate tubular member 26 that is rotatably supported at its opposite ends by first and second mounting brackets 22, 24, that are rigidly secured to the conveyor frame 16. In an example embodiment, the scraper blade 20 is removably mounted to a scraper blade bracket 28 provided on the tubular member 26. With reference to FIG. 4, the scraper blade support further includes an elongate internal torsion bar 30 that passes through, and is co-axial with, the tubular member 26. As will be explained in greater detail below, the torsion bar 30 imparts a torsional bias on the tubular member 26, which in turn transmits the torsional bias onto scraper blade 20 to maintain it in contact with conveyor belt 12. The tubular member 30 is a substantially cylindrical wall having a circular cross-section in the illustrated example embodiment, however other configurations could also be used for tubular member.

At one end 31, the torsion bar 30 is rigidly connected to the tubular member 26—by way of example, in one embodiment, a disc-like connector 32 rigidly connects the torsion bar end 31 to an inner surface of the tubular member 26, although other connector configurations, for example a connector comprising one or more radially extending spokes, can be used. Other than connected end 32, the remainder of the torsion bar 30 is permitted to have a degree of rotational movement relative to the tubular member 26, and a lever arm 36 is rigidly connected to the opposite end 33 of the torsion bar 30 for imparting a torsional bias to the torsion bar 30.

In one embodiment, one or more bushings 34 are provided along the length of the torsion bar 30 to maintain the correct spacing between, and the co-axial alignment of, the torsion bar 30 and the tubular member 26. In the illustrated embodiment, bushing 34 is a disk-like member rigidly connected at its center to the torsion bar 30 to rotate therewith, and having an outer surface that rotatably engages the inner surface of the tubular member 26. Other bushing configurations can also be used, for example the bushing could rigidly engage the tubular member 26 rather than the torsion bar 30, or could rigidly engage neither the tubular member or the torsion bar.

As best seen in FIGS. 1 and 2, the lever arm 36 has a first end 38 and a second end 40 located on opposite sides of the lever arm pivot axis, which is the point at which the lever arm is connected to torsion bar 30. The first end 38 functions as a handle that a human operator can apply pressure to and adjust the torsion applied to torsion bar 30. An opening 42 is provided through the second end 40 of the lever arm for cooperating with a selected one of a plurality of openings 44 provided through the first bracket 22. A securing cotter pin 46 (see FIGS. 2 and 4) is placed through the lever arm opening 42 and an aligned one of the bracket openings 44 to maintain the lever arm in a selected position once the operator has applied a desired torsional force to the torsion bar 30. As the scraper blade 20 wears down, the position of the lever arm 36 can be periodically adjusted by an operator by aligning the lever arm opening 42 with a subsequent bracket opening 44 and inserting the pin 46 therethrough. FIG. 2 and FIG. 1 show the lever arm 36 in two different positions. Although the lever arm opening 42 is shown near the second end 40 of the lever arm 36, it could alternatively be located elsewhere, such as on the handle side of the lever arm pivot axis, for example, with bracket openings 44 being located in corresponding locations. In the place of a cotter pin and cooperating openings configuration, other known securing configurations could also be used to lock the lever arm 36 in a selected position to the bracket 22, such as a ratchet teeth and pawl configuration, for example. The lever arm 36 could take various forms—for example, it could be replaced by a wheel or knob or other type of lever device.

In an example embodiment, a stopper plate 48 is rigidly attached to and extends outward from the tubular member 26. The stopper plate 48 is configured to prevent the blade from being dragged under the belt 14 if it wears down too far. In particular, if the blade 20 wears down a predetermined distance, the stopper plate 48 rotates sufficiently to engage a stop member 78 (shown in phantom in FIGS. 1 and 2) that protrudes inwardly from bracket 22, thereby preventing further rotation of the outer tubular member 26.

In an example embodiment, outward projecting first and second cylindrical connectors 50 and 52 are provided on the first and second brackets 22, 24, respectively. A first weld plate 54 is pivotally and slidably mounted to the first connector 50 and a second weld plate 56 is pivotally mounted and slidably mounted to the second connector 52 such that, prior to installation on a conveyor system 12 each weld plate 54, 56 can be slid inwards and outwards along its respective connector 50, 52, (as indicated by arrow 70 in FIG. 3) and rotated about its respective connector (as indicated by arrow 68). When the belt scraper 10 is to be mounted to a conveyor system 12, the spacing between the weld plates 54 and 56 is adjusted as required for attachment to the specific conveyor frame, and the weld plates 54 and 56 welded to the frame. Additionally, the weld plates 54, 56 are rotated about and then rigidly welded to their respective connectors 50, 52 at the appropriate angle to correctly position the scraper blade support relative to the conveyor belt 14. It will thus be appreciated that the combination of connectors 50, 52 and weld plates 54, 56 allow the belt scraper to be secured to a variety of conveyor belt frames that have differing configurations and sizes.

In one example embodiment, the scraper blade bracket 28 is a plate that extends outward from the tubular member 26, and which has a plurality of mounting holes 58 (see FIG. 4) provided therethrough for receiving bolts 62 to secure the scraper blade 20 to the scraper blade bracket 28. The scraper blade 20 includes a row of openings 62 for receiving bolts 62. In and example embodiment, the scraper blade 20 is bisymmetrical about the row of openings 62, and has two useable scrapping edges 64 and 66. When one edge is suitably worn down, the blade 20 can be detached from scraper blade bracket 28, turned around 180 degrees, and remounted so that the opposite scrapping edge is located adjacent the conveyor belt 14. The scraper blade 20 can be made out of a number of materials, and in an example embodiment is made of a tough resilient material such as rigid urethane, and the belt scraper device 10 is generally constructed of steel components. As seen in FIGS. 1 and 2, the scrapping edges 64 and 66 of the blade 20 are angled.

The operation of belt scraper 10 will now be described. With the scraping end of scraper blade 20 engaging the conveyor belt 14, an operator applies pressure to the handle end 38 of lever arm 36, causing a torsional force to be applied to torsion bar 30, which in turn applies a torsional bias to the tubular member 26 that is transferred to scraper blade 20, biasing the blade 20 against the conveyor belt. When a desired bias is applied, the lever arm 36 is secured in place by inserting locking pin 46 through the lever arm opening 42 and into a selected bracket opening 44. When the lever arm 36 is moved into its desired position, the end 33 of the torsion bar 30 rotates relative to the tubular member 26, whereas the opposite end 31 of the torsion bar that is fixed to the tubular member does not, thereby storing bias energy in the torsion bar 30 so that force between the blade 20 and the conveyor belt 14 is maintained as the blade 20 wears down. Such a configuration maintains a relatively, consistent bias pressure between the blade 20 and the belt 14 throughout a range of blade wear as such pressure is proportional to the torsional force applied by torsion bar 30 and inversely proportional to the length of the blade 20—thus the decreasing length of the blade and the resulting decrease in torsional force applied by the torsion bar counterbalance each other to an extent. After the blade wears down a predetermined amount, an operator can adjust the position of lever arm 36 and lock it into the new position.

In some embodiments, mounting brackets 22 and 24 are omitted, with blade support 18 being mounted to brackets integral to conveyor frame 16 and the lever arm 36 being securable in selected positions relative to the conveyor frame 16. Scraper blade bracket 28 could take a number of configurations other than as shown. For example, it could include a slot for receiving an end of the blade therein. In some embodiments, a plurality of blades 20 are positioned side-by-side across the tubular member 26, rather than just a single blade. Although shown as having an uninterrupted outer surface, in some embodiments tubular member 26 could include slots or other openings along its length.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A conveyor belt scraper tensioning device including:

an elongate tubular support member mounted to at least partially rotate about a first axis, the tubular member being defined by an outer wall radially spaced apart from the first axis and having a scraper blade bracket located on the outer wall for securing a scraper blade thereto;

a torsion bar located substantially within the tubular member along the first axis for imparting a torsional bias to the support member, the torsion bar having a first portion connected to the support member and a further portion spaced apart from and at least partially rotatable relative to the support member, and a lever member connected to the further portion of the torsion bar at a location spaced apart from the first portion for imparting torsional bias on the torsion bar, wherein the tubular member has first and second ends, the first portion of torsion bar being connected to the tubular member near the second end of the tubular member, the lever member being connected to an end of torsion bar that extends beyond the first end of the tubular member.

2. A conveyor belt scraper tensioning device including:
a support member mounted to at least partially rotate about a first axis, the support member being radially spaced apart from the first axis and having a scraper blade bracket for securing a scraper blade thereto;
a torsion bar located substantially along the first axis for imparting a torsional bias to the support member, the torsion bar having a first portion connected to the support member and a further portion spaced apart from and at least partially rotatable relative to the support member;
a lever member connected to the further portion of the torsion bar at a location spaced apart from the first portion for imparting torsional bias on the torsion bar; and
first and second spaced apart bracket members supporting the support member at opposite ends thereof, the lever member being located adjacent the first bracket member and securable to the first bracket member in a plurality of selectable positions for adjusting the torsional bias applied to the torsion bar.

3. A conveyor belt scraper tensioning device including:
a support member mounted to at least partially rotate about a first axis, the support member being radially spaced apart from the first axis and having a scraper blade bracket for securing a scraper blade thereto;
a torsion bar located substantially along the first axis for imparting a torsional bias to the support member, the torsion bar having a first portion connected to the support member and a further portion spaced apart from and at least partially rotatable relative to the support member;
a lever member connected to the further portion of the torsion bar at a location spaced apart from the first portion for imparting torsional bias on the torsion bar; and
a scraper blade removably mounted to the scraper blade bracket, the scraper blade being reversible with first and second opposite ends that each have a scraping edge for scrapping the conveyor belt, wherein the scraper blade includes a row of openings along a center line between the first and second opposite ends thereof, the scraper blade being secured to the scraper blade bracket by fasteners extending through the openings.

4. In combination with a conveyor belt system having a conveyor belt mounted to a support frame, a scraper blade support device including:
a tubular member having opposite first and second ends mounted to the support frame, the tubular member being at least partially rotatable about an axis that is substantially transverse to a direction of travel of the conveyor belt;
a scraper blade extending outward from the tubular member and having an end for engaging the conveyor belt for removing material therefrom;
a torsion bar extending along the axis inside the tubular member, the torsion bar having a first portion rigidly attached to the tubular member near the second end thereof for imparting a torsional bias thereto and a further portion near the first end of the tubular member that is partially rotatable relative to the tubular member; and a lever member connected to an end of the torsion bar that extends beyond the first end of the tubular member for imparting a torsional bias to the torsion bar.

5. The device of claim 1 wherein the first portion of the torsion bar is connected by a radially extending connector to the tubular member, and at least one radially extending bushing is located on the torsion bar within the tubular member for maintaining relative radial spacing between the tubular member and the torsion bar.

6. The device of claim 1 including first and second spaced apart bracket members supporting the first and second ends of the tubular member, respectively, the lever member being located adjacent the first bracket member and securable to the first bracket member in a plurality of selectable positions for adjusting the torsional bias applied to the torsion bar.

7. The device of claim 6 wherein each of the first and second bracket members includes an outwardly projecting connector on which a weld plate is mounted for, prior to installation on a conveyor belt system, rotation about a second axis that is substantially parallel to the first axis and sliding movement along the connector lateral to the second axis.

8. The device of claim 2 wherein each of the first and second bracket members includes an outwardly projecting connector on which a weld plate is mounted for, prior to installation on a conveyor belt system, rotation about a second axis that is substantially parallel to the first axis and sliding movement along the connector lateral to the second axis.

9. The device of claim 3 wherein the tubular member is defined by an outer wall on which a scraper blade bracket is located, the scraper blade being removably mounted to the scraper blade bracket.

10. The device of claim 9 wherein the scraper blade is reversible with first and second opposite ends that each have a scraping edge for scrapping the conveyor belt.

11. The device of claim 10 wherein the scraper blade includes a row of openings along a center line between the first and second opposite ends thereof, the blade being secured to the scraper blade bracket by fasteners extending through the openings.

12. The device of claim 4 wherein the first portion of the torsion bar is connected by a radially extending connector to the tubular member, and at least one radially extending bushing is located on the torsion bar within the tubular member for maintaining relative radial spacing between the tubular member and the torsion bar.

13. The device of claim 4 including first and second spaced apart bracket members connected to the support frame and supporting the first and second ends of the tubular member, respectively, the lever member being located adjacent the first bracket member and securable to the first bracket member in a plurality of selectable positions for adjusting the torsional bias applied to the torsion bar.

14. The device of claim 13 wherein the lever member has a securing opening therethrough that can be selectively aligned with openings provided through the first bracket member corresponding to the plurality of selectable positions and including a locking pin for insertion through the securing opening and an aligned one of the openings through the first bracket member to secure the lever member.

* * * * *